United States Patent
Travis

(10) Patent No.: US 8,745,014 B2
(45) Date of Patent: Jun. 3, 2014

(54) TIME SERIES DATA MAPPING INTO A KEY-VALUE DATABASE

(75) Inventor: Jonathan Travis, San Francisco, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 201 days.

(21) Appl. No.: 13/277,054

(22) Filed: Oct. 19, 2011

(65) Prior Publication Data

US 2013/0103658 A1 Apr. 25, 2013

(51) Int. Cl.
*G06F 17/00* (2006.01)

(52) U.S. Cl.
USPC .......................................... 707/700

(58) Field of Classification Search
CPC .................... G06F 17/30091; G06F 17/30289; G06F 17/30312
USPC .......................................... 707/700
See application file for complete search history.

(56) References Cited

U.S. PATENT DOCUMENTS

| | | | |
|---|---|---|---|
| 2003/0028546 A1* | 2/2003 | Keller et al. ................... | 707/100 |
| 2005/0128201 A1* | 6/2005 | Warner et al. .................. | 345/474 |
| 2006/0252016 A1* | 11/2006 | Terasawa ....................... | 434/238 |
| 2007/0079195 A1* | 4/2007 | Ueno et al. ..................... | 714/731 |
| 2009/0112927 A1* | 4/2009 | Chitnis et al. ............... | 707/104.1 |
| 2009/0281839 A1* | 11/2009 | Lynn et al. ........................ | 705/3 |
| 2010/0235334 A1* | 9/2010 | Porter ............................ | 707/694 |
| 2010/0325132 A1* | 12/2010 | Liu et al. ........................ | 707/759 |
| 2011/0289033 A1* | 11/2011 | Gargi et al. ..................... | 706/20 |

OTHER PUBLICATIONS

Black, Benjamin "Present Tense—Challenges and Trade-Offs in Building a Web-scale Real-time Analytics System" http://strataconf.com/strata2011/public/schedule/detail/17058, US, pp. 1-30, Feb. 3, 2011.

Weil, Kevin "Rainbird: Real-Time Analytics @Twitter" http://www.slideshare.net/kevinweil/rainbird-realtime-analytics-at-twitter-strata-201, US, pp. 1-60, Feb. 3, 2011.

* cited by examiner

*Primary Examiner* — Isaac M Woo
*Assistant Examiner* — Tiffany Thuy Bui
(74) *Attorney, Agent, or Firm* — Fish & Richardson P.C.

(57) ABSTRACT

A method for storing time series data in a key-value database includes receiving time series data relating to the occurrence of an event. An addressing scheme that defines attributes for inclusion in keys for the event is analyzed. The attributes include time granularity attributes of different sizes. The method generates a key corresponding to the time series data based on the analyzing of the addressing scheme including attributes specified in the addressing scheme that are related to the event and one of the attributes represents one of the plurality of time granularity attributes. The method further issues a command to the key-value database to store a record of the occurrence of the event as a value in the key-value database where stored values in the key-value database corresponding keys may be used to satisfy queries relating to the event over a range of time.

21 Claims, 9 Drawing Sheets

TIME SERIES DATA MAPPING INTO A KEY-VALUE DATABASE

BACKGROUND

Time series data may include data points that are measured over time. One example of generating time series data may be the recordation by a web server of the times when users access web pages. When a user visits a web page, a logging function in a web server may capture time series data that includes a time value and an identifier (e.g., pathname, etc.) for a particular web page within the web site. The captured time series data may then be analyzed by a web server administrator over periods of time. For example, the web server administrator may desire to determine the number of times a particular web page of a web site was visited over a specific time range (e.g., over the last week, etc.).

Time series data is typically stored in a relational database or a database where row scans are allowed. For example, each time a web page of a web site is visited, the web server can store data relating to the visit in a table of a relational database where each row in the table represents a separate visit to the web server. The first column of the table may store the actual time value and the second column of the table may store the pathname of the visited web page within the web site. If an administrator of the web site wants to know the number of times a particular web page was visited during a specified period of time, the administrator can formulate a query for (and ultimately issue the query to) the relational database that specifies the range of values for the specified time as well as the pathname of the web page. In response, the relational database can scan the rows of the table to determine how many entries have time values (e.g., first column values) within the time range and have a pathname (e.g., second column values) corresponding to the web page. The number of times the web page was visited within the time frame then equals the number of determined rows from the query. While allowing arbitrary time ranges to be queried is useful, storing data in a relational database may have disadvantages, such as scalability and operational complexity.

SUMMARY

In one embodiment, a method for storing time series data in a key-value database includes receiving time series data relating to the occurrence of an event. An addressing scheme that defines attributes for inclusion in keys for the event is analyzed. The attributes include a plurality of time granularity attributes of different sizes. The method generates at least one key corresponding to the time series data based on the analyzing of the addressing scheme. The at least one key includes a plurality of attributes specified in the addressing scheme that are related to the event and one of the attributes represents one of the plurality of time granularity attributes. For each generated key, the method further issues a corresponding command to the key-value database to store a record of the occurrence of the event as a value in the key-value database in association with the generated key where stored values in the key-value database corresponding to the plurality of keys may be used to satisfy queries relating to the event over a range of time.

In one embodiment, a non-transitory computer-readable storage medium is provided containing instructions configured to store time series data in a key-value database for controlling a computer system to be operable to: receive time series data relating to the occurrence of an event; analyze an addressing scheme that defines attributes for inclusion in keys for the event, wherein the attributes include a plurality of time granularity attributes of different sizes; generate at least one key corresponding to the time series data based on the analyzing of the addressing scheme, wherein the at least one key includes a plurality of attributes specified in the addressing scheme that are related to the event and one of the attributes represents one of the plurality of time granularity attributes; and for each generated key, issue a corresponding command to the key-value database to store a record of the occurrence of the event as a value in the key-value database in association with the generated key, wherein stored values in the key-value database corresponding to the plurality of keys may be used to satisfy queries relating to the event over a range of time.

In one embodiment, an apparatus configured to store time series data in a key-value database is provided that includes one or more computer processors and a computer-readable storage medium. The computer-readable medium includes instructions for controlling the one or more computer processors to be operable to: receive time series data relating to the occurrence of an event; analyze an addressing scheme that defines attributes for inclusion in keys for the event, wherein the attributes include a plurality of time granularity attributes of different sizes; generate at least one key corresponding to the time series data based on the analyzing of the addressing scheme, wherein the at least one key includes a plurality of attributes specified in the addressing scheme that are related to the event and one of the attributes represents one of the plurality of time granularity attributes; and for each generated key, issue a corresponding command to the key-value database to store a record of the occurrence of the event as a value in the key-value database in association with the generated key, wherein stored values in the key-value database corresponding to the plurality of keys may be used to satisfy queries relating to the event over a range of time.

The following detailed description and accompanying drawings provide a more detailed understanding of the nature and advantages of the present invention.

DETAILED DESCRIPTION

In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

System Overview

Figure 1:
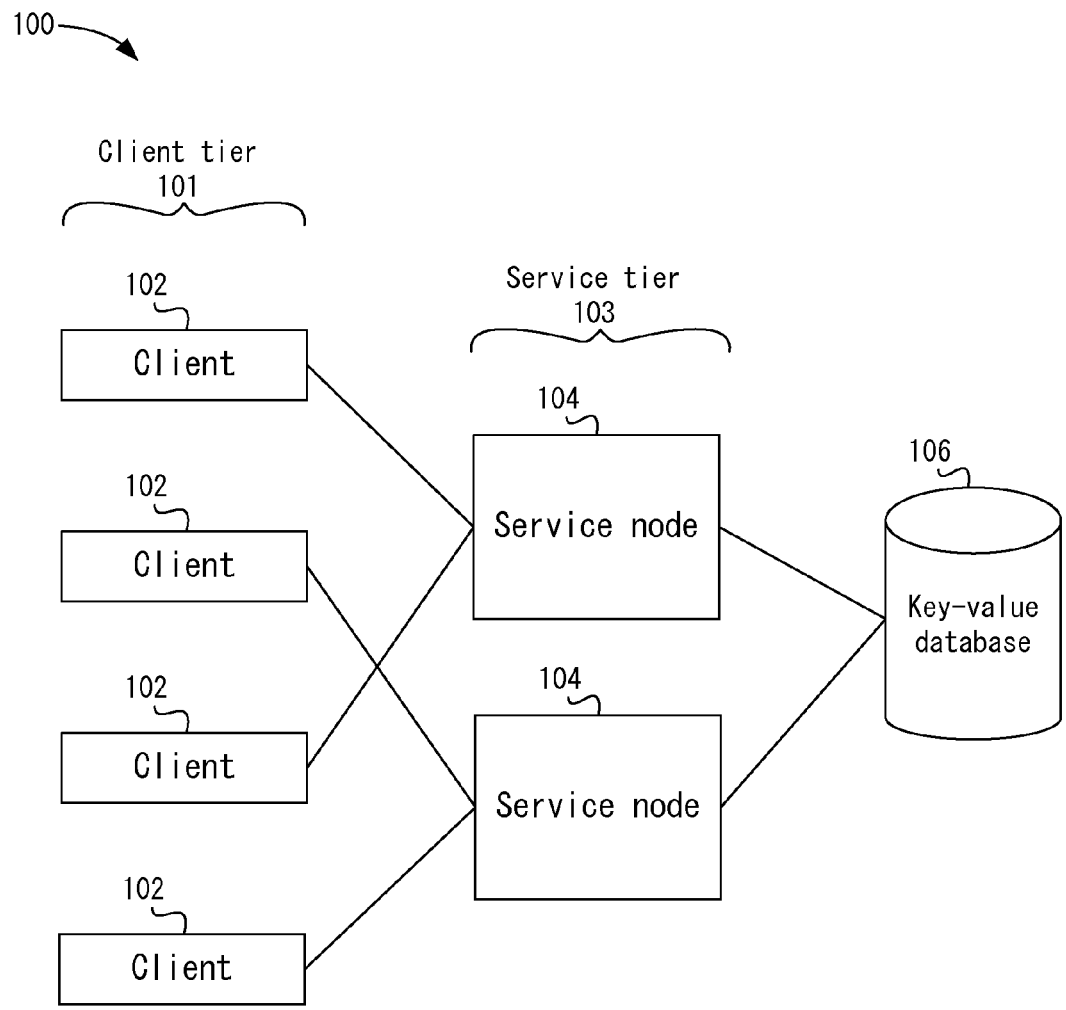
FIG. 1 depicts a simplified system for storing time series data according to one embodiment.

FIG. 1 depicts a simplified system 100 for storing time series data according to one embodiment. A client tier 101 includes one or more clients 102. Clients 102 may be producers of time series data or consumers of time series data. One example of a producer client 102 is a web server hosting an ecommerce web site or application that is configured to log or store time series data relating to objects (e.g., color, shape, time purchased, etc.). An example of a consumer client 102 may be a management application used by an administrator of the web site, such as the Spring Insight administration tool from SpringSource, that may be used to analyze the behavior and performance of the ecommerce web site and respond to such questions as "how many red cubes were sold in the month of January on the web site." Key-value database 106 includes computing machines that store keys and the keys' associated values. Examples of a database that may be utilized as a key-value store or database 106 is VMware's vFabric™ Gemfire® platform, Apache Cassandra, CouchDB, HBase and other known key-value stores, although it should be recognized that any databases, including relational database such as MySQL, etc., may be utilized as a key-value database 106 in embodiments.

A service tier 103 includes one or more service nodes 104 that receive time series data from producer clients 102. Service nodes 104 include one or more distributed computers that provide a service to producer clients 102 to store data in key-value database 106. Such a service node 104 maps or otherwise transforms the "raw" time series data into a key-value format that can be issued to and stored in key-value database 106. Service nodes 104 also receive "time domain" queries (e.g., that request data occurring within a certain time range, such as the number of visits to a web page during a specified period of time, etc.) from consumer clients 102 and map or otherwise transform such queries into one or more "key-value" queries that can actually be issued to and satisfied by key-value database 106.

Key-value database 106 stores data in key-value pairs. Although not shown, key-value database 106 may include database management servers that support key-value commands, for example, to insert or delete key-value data into database 106, find or query for values stored in database 106 by providing corresponding keys, or adjust values of key-value data in database 106 (e.g., incrementing, decrementing or otherwise modifying already-stored values of key-value data, etc.). In certain embodiments, key-value database 106 may be distributed and stored key-value pairs may be spread across many computing machines.

In a data collection process, service nodes 104 map time series data produced by producer clients 102 into key-value pairs for storage in key-value database 106. As further discussed below, an administrator may develop an "addressing scheme" that can be used by service nodes 104 to interpret received time series data in order to generate corresponding keys for key-value database 106. In one embodiment, the administrator may pre-determine the structure of keys that should be generated by service nodes 104 while in alternative embodiments, service nodes 104 may generate keys based on information in the addressing scheme provided by the administrator. When service node 104 receives time series data from a producer client 102, service node 104 consults the addressing scheme to determine what "attributes" should be incorporated into a key corresponding to the received time series data. For example, if a producer client 102 transmits to service node 104 times series data indicating that a red cube was sold on the ecommerce web site at 12:00 pm on Jan. $1^{st}$, service node 104 may consult its addressing scheme to determine that attributes relating to color, shape and time should be captured in a generated key. As such, service node 104 then generates a key of "(red, cube, January $1^{st}$: 1 day)" corresponding to the received time series data. This key can then be used by service node 104 to submit a command to key-value database 106 to keep track of the number of red cubes (e.g., the "value" of a key-value pair, as further discussed herein) that have been sold to date on January $1^{st}$. Such a data collection process enables the offering of a subsequent query processing capability to allow a consumer client 102 to submit time domain queries to service node 104, wherein the consumer client 102 submits a query with a time range, such as "how many red cubes were sold in January." In response, service node 104 may generate one or more key-value queries for keys in database 106. For example, a query for a key of "(red, cube, January $1^{st}$: 1 day)" may be one query. Database 106 would return the number of red cubes sold on January $1^{st}$. As further discussed herein, because this response covers only one day in January, service node 104 may submit additional queries for keys for the other days of the months (e.g., queries for each other day or queries for blocks of days). Before discussing the data collection process and query processing capability in detail, an addressing scheme, as previously referred to, that is used by service node 102 to map or otherwise transform between time domain queries into one or more key-value queries that can be submitted to key-value database 106 will be described.

Addressing Scheme

In certain embodiments, an addressing scheme for a particular data set (e.g., objects sold on an ecommerce web site, etc.) may be specified by an administrator (e.g., administrator of the ecommerce web site, etc.) and provided to service node 104 in order to map or translate time series data (e.g., description of objects sold on the ecommerce website over time, etc.) generated by a producer client 102 (e.g., ecommerce web server, etc.) into one or more key-value commands (increment, insert, modify, etc.) that may be issued to key-value database 106. Such an addressing scheme may define attributes for a key. For example, the key of a key-value pair generated by service node 104 upon receipt of time series data from producer client 102 may be an N-tuple of attributes corresponding to a vector within a hypercube. Each attribute of the N-tuple key may belong to a different dimension (e.g., color dimension, shape dimension and time dimension for sold objects, etc.). Furthermore, the value of attributes in an N-tuple key may be dependent upon a "hierarchy" specified in the addressing scheme for the dimension to which the attribute belongs. For example, as will be discussed in further detail below, a hierarchy for the time dimension may be represented by different granularity layers of time windows (e.g., a 1 day granularity, a 2 day granularity, etc.).

Figure 2:
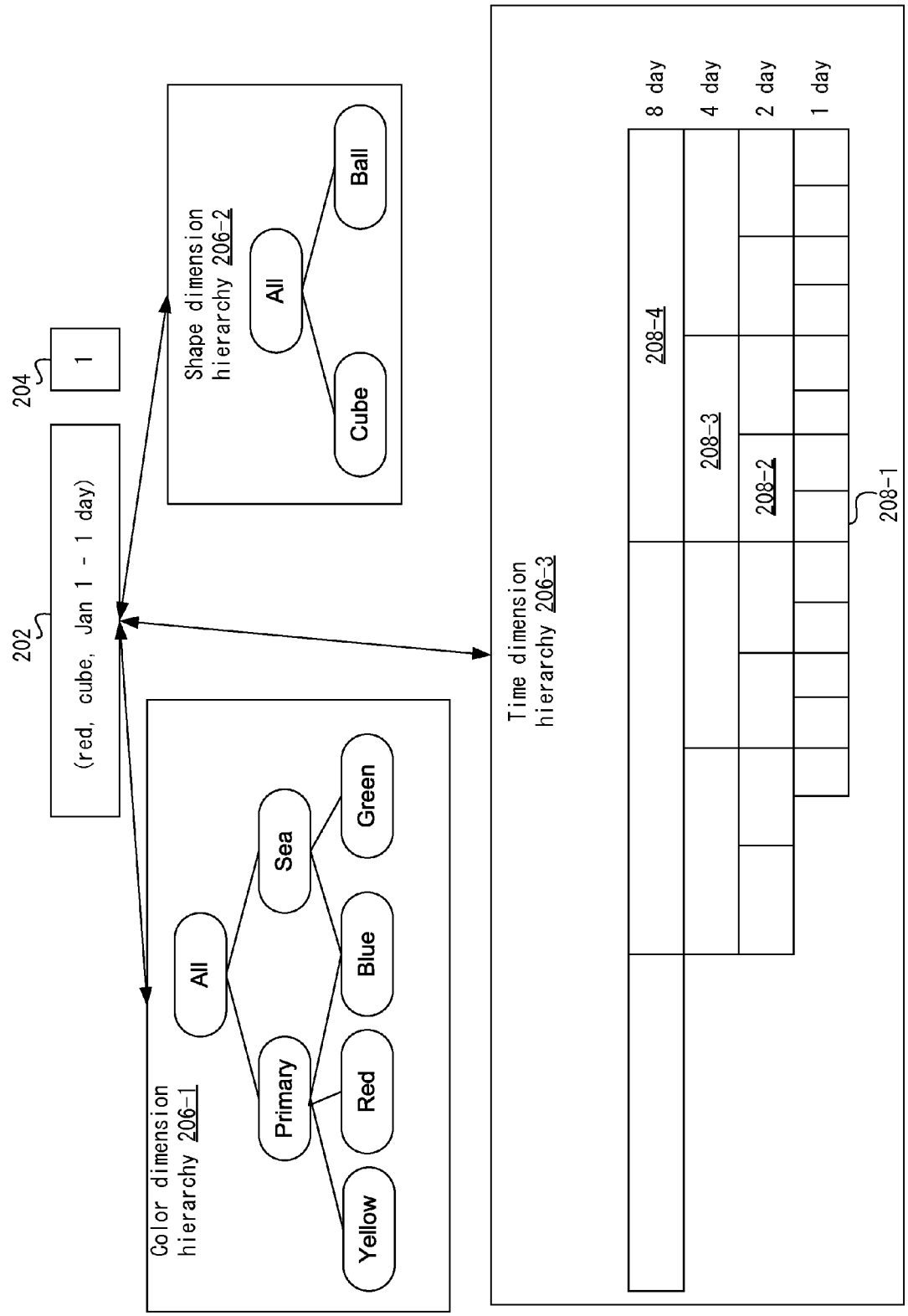
FIG. 2 shows an example of the addressing scheme according to one embodiment.

FIG. 2 shows an example of a specified addressing scheme according to one embodiment. In the embodiment of FIG. 2, the particular data set corresponding to the addressing scheme relates to attributes of objects that are sold on an ecommerce web site. Upon receipt of time series data from a producer client 102, service node 104 may consult the addressing scheme to determine the specified attributes for a key and generate a key 202 that may include three attributes that correspond to the dimensions of color, shape, and time. The color dimension is the color of a sold object and the shape dimension is the shape of the sold object. The time dimension expresses a period of time in which the object was sold.

Service node 102 may further generate a new value 204 or request modification of a pre-existing value 204 that is already stored in database 106 in association with key 202. In the embodiment of FIG. 2, value 204 is a scalar value (e.g., counter) representing the number of objects having the color and shape attributes specified in key 202 that have been sold within the time attribute specified in key 202. It should be recognized that in alternative embodiments, value 204 may be represented by rich statistics (e.g., a histogram), serialized objects, or other types of rich data rather than scalar values. If, for example, the time series data of producer client 102 received by service node 104 indicates that a red cube was just sold on the ecommerce site, then service node 104 may generate a key-value pair having a key of "(red, cube, January $1^{st}$: 1 day)" and a value of 1 to indicate that one red cube was just sold. Depending upon whether such a generated key-value pair already has a value in key-value database 106, service node 104 would then issue either an "insert" key-value command to add the key-value pair to database 106, or a "modify" or "increment" key-value command to database 106 to update the current value of the key value pair stored in database 106. Although the term "increment" is generally used herein, it should be recognized that service node 104 may issue commands to modify a value, such as modifying a value from 3 to 10 if 7 red cubes are sold within a time window.

As further depicted in the embodiment of FIG. 2, the color, shape, and time dimension are hierarchical, with a hierarchy 206-1 for the color dimension, a hierarchy 206-2 for the shape dimension, and a hierarchy 206-3 for the time dimension. Color dimension hierarchy 206-1 and shape dimension hierarchy 206-2 are arranged in a hierarchical directed graph. For example, a "Red" node is a child of a "Primary" node under a root node of "All". Also, a "Cube" node is a child of a root node "All".

Time dimension hierarchy 206-3 of FIG. 2 is represented by different time granularity layers. Each granularity layer includes time windows of a different size. For example, each granularity layer contains time windows that are a multiple of the size (i.e., time period) of the previous layer. In this example, the granularities are 1 day, 2 day, 4 day, and 8 day, but other time windows may be used. The time window may be based on a start time and a duration. For example, for the 1 day granularity layer, a time window 208-1 may start on January 1 and last for 1 day. Also, for the 2 day granularity layer, a time window 208-2 may start on January 1 and last for 2 days. Time windows 208-3 and 208-4 for the 4 day and 8 day granularities respectively start on January 1 and last for 4 days and 8 days. The next time window in each granularity layer starts when the previous time window ends. For example, in the 2 day granularity window, the next time window starts on January 3 and lasts for 2 days. A time window starting on January $2^{nd}$ and lasting for 2 days does not exist. In this case, time windows in a specific granularity layer do not overlap. However, in other embodiments, overlapping time windows may be used in a single granularity layer.

In certain embodiments, an administrator may specify a pre-determined structure for keys in the addressing scheme that may be generated by service node 104. For example, if the administrator desires to keep track of red cubes being sold, the administrator may specify in the addressing scheme that keys generated by service node 104 include shape, color and time attributes. As such, when a red cube is sold on January $1^{st}$, service node 104 consults the addressing scheme and generates a key with a pre-determined structure of "(red, cube, January $1^{st}$: 1 day)." It should be recognized, however, that alternative embodiments may utilize a more dynamic approach in specifying the structure of keys in the addressing scheme. For example, rather than specifying a fixed or pre-determined number of attributes to include in generated keys, the addressing scheme may provide a number of flexible options for generating keys depending upon the nature of the time series data received.

As further discussed below, in certain embodiments, when service node 104 receives time series data from producer client 102, service node 104 may generate multiple key-value commands (e.g., insert, modify, etc.) to key-value database 106 in order to store the time series data in key-value database 106. These multiple key-value commands may correspond to different time granularity layers of the specified time dimension hierarchy (e.g., time dimension hierarchy 206-3) and facilitate retrieval of data from database 106 when consumer clients 102 issue time series queries.

Data Collection

Figure 3:
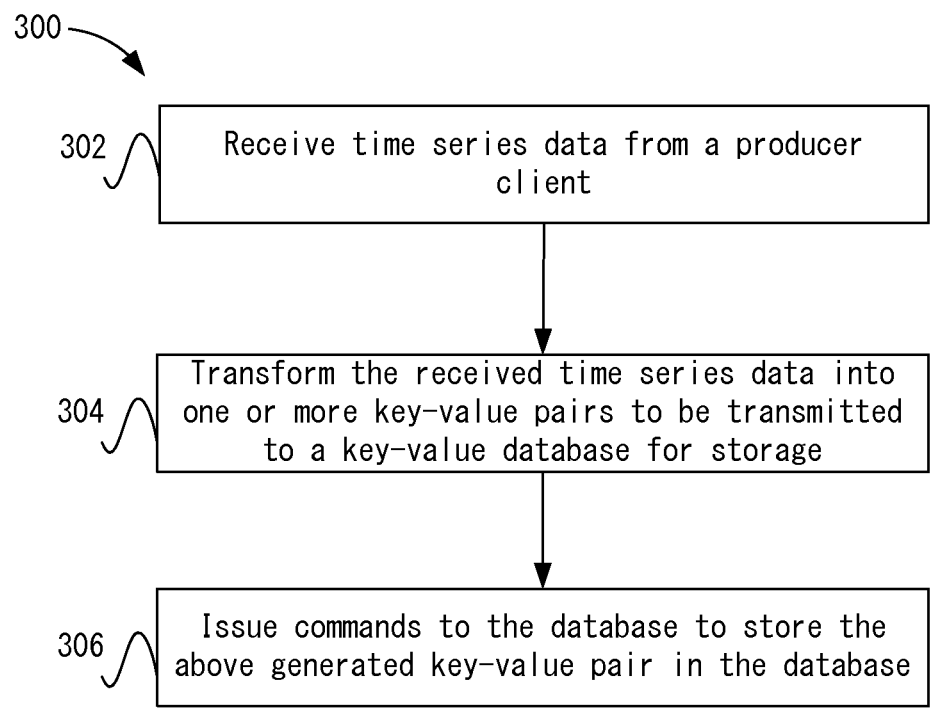
FIG. 3 depicts a simplified flowchart for mapping from the time domain into a key-value domain according to one embodiment.

As previously discussed, when time series data is generated or collected by producer client 102 and transmitted to service node 104, service node 104 transforms the time series data into one or more key-value pairs that may be issued to key-value database 106 for storage. FIG. 3 depicts a simplified flowchart 300 for transforming time series data into key-value pairs according to one embodiment. At 302, service node 104 receives time series data from producer client 102. Such received time series data may include a time value relating to a time when such data was received and a metric value relating to a standard of measurement that an administrator desires to track. For example, received time series data may include the specific time that a number of red cubes have been purchased at an ecommerce web site (e.g., the specific time being the time value and the number of red cubes being the metric value).

At 304, service node 104 transforms the received time series data into one or more key-value pairs to be transmitted to key-value database 106 for storage. For example, service node 104 may consult an addressing scheme for the data set that was specified by the administrator (as discussed above) to determine the number of attributes of dimensions (e.g., color, shape and time, etc.) in a generated key that corresponds to the time series data. In one example, when producer client 102 determines that a red cube was sold at 3 PM on January $1^{st}$, the time value for the sale and data relating to the nature of the object sold (e.g., red and cube) are logged. Producer client 102 then transmits such time series data to service node 104, for example, through an application programmer interface (API) provided by service node 104.

If the received time series data indicates that a red cube was just sold (e.g., at 3 PM on January $1^{st}$, etc.) and the specified addressing scheme indicates that the finest time granularity is a time window of 1 day, then service node 104 generates a key of "(red, cube, January $1^{st}$: 1 day)" and a value of "1" indicating that a single red cube was just sold as indicated by the time series data.

At 306, service node 104 may then issue commands to database 106 to store the above generated key-value pair in database 106. For example, service node 104 may either insert a new key 202 into database 106 or modify a value of an existing key 202 in database 106. Service node 104 may keep track of inserted keys 202 (and also which computing machines the keys are stored on, which is described later). If a key 202 has not been created in database 106, service node 104 may issue an "insert" or similar command to key-value database 106 to insert the key-value pair, such as [(red, cube, January $1^{st}$: 1 day), 1] into database 106. If there is a current value stored in database 106 for the generated key, service node 104 may issue a "modify" or similar command to key-value database 106 to modify (e.g., increment, decrement, merge, etc.) the current value stored in database 106. For example, if the value stored in association with the key acts as a counter (e.g., total number of red cube sales on January $1^{st}$), then the counter for the key is incremented.

Figure 4:
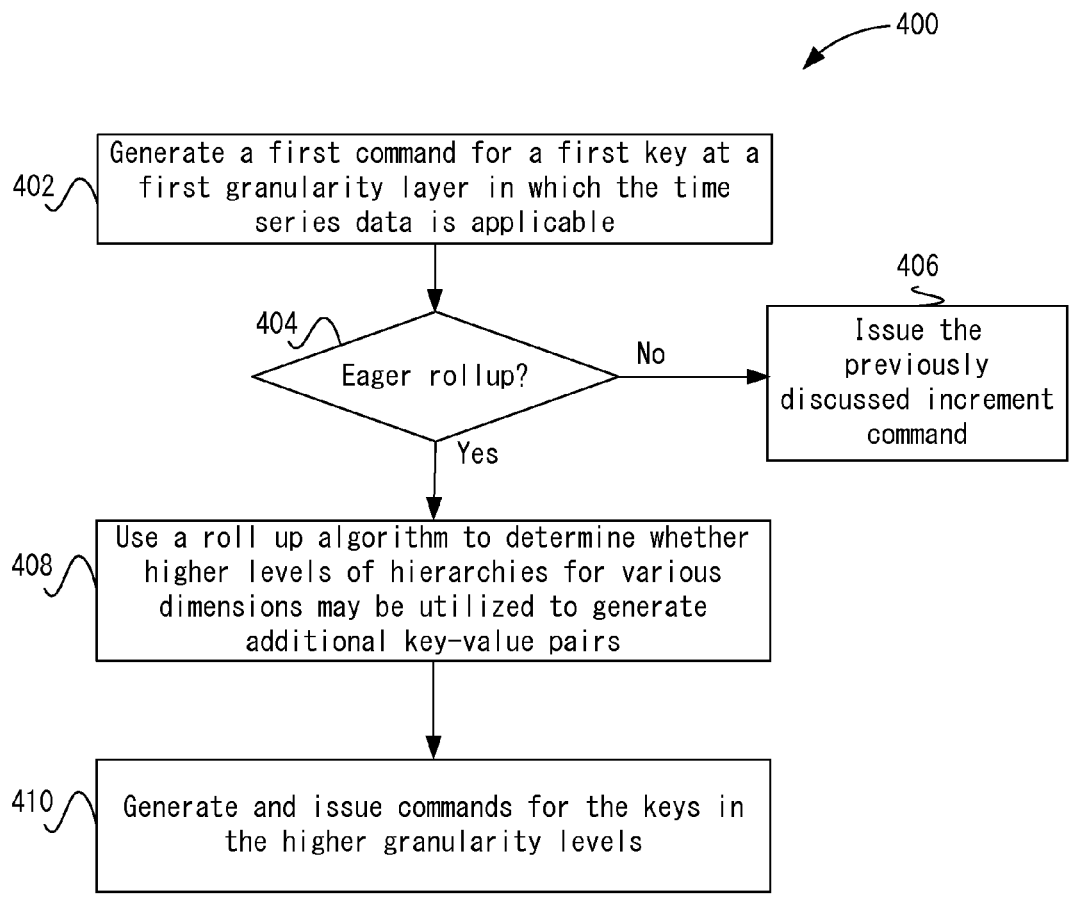
FIG. 4 depicts a simplified flowchart of a method for eagerly rolling up time series data according to one embodiment.

In certain embodiments, service node 104 may "eagerly roll up" time series data received from producer clients 102 along one or more dimensions by issuing multiple commands to database 106 for a particular time series data. FIG. 4 depicts a simplified flowchart 400 of a method for eagerly rolling up time series data according to one embodiment. At 402, service node 104 generates a first command for a first key at a first granularity layer in which the time series data is applicable. For example, such a first command may be the previously discussed insert command for the key-value pair, [(red, cube, January $1^{st}$: 1 day), 1] or if a counter is the metric being used, then an increment command for the generated key, (red, cube, January $1^{st}$: 1 day) that increments a pre-existing stored value for the generated key. At 404, if service node 104 has not been configured to perform "eager roll ups," then at 406, service node 104 simply issues the previously discussed insert or increment command to database 106.

If service node 104 has been configured to perform "eager roll ups," then at 408, service node 104 uses a roll up algorithm to determine whether higher levels of hierarchies for various dimensions may be utilized to generate additional key-value pairs. For example, the addressing scheme may indicate to service node 104 that "eager roll-up" should be performed and that multiple granularity levels along the time dimension should be "rolled up." For example, referring to the addressing scheme of FIG. 2, upon receipt of time series data from a producer client 102 indicating that a red cube has just been sold on January $1^{st}$, service node 104 may generate additional commands to issue to database 106 for higher time granularities such as 2 days (red, cube, January $1^{st}$: 2 days), 4 days (red, cube, January $1^{st}$: 4 days) and 8 days (red, cube, January $1^{st}$: 8 days) time windows. That is, if the time series data indicates that a red cube was sold on January $1^{st}$, then the same red cube would also have been sold within the higher level time granularities of January $1^{st}$-$2^{nd}$, January $1^{st}$-$4^{th}$ and January $1^{st}$-$8^{th}$ time windows, respectively. As such, at 410, service node 104 generates and issues commands for the keys in the higher granularity levels. The values corresponding to keys that have higher level time attributes (e.g., 2 days, 4 days and 8 days) are incremented by database 106 according to commands issued by service node 104.

It should be recognized that the number of additionally issued commands by service node 104 due to eager roll ups may vary based on the degree of roll ups desired, the attributes of keys for which eager roll up is desired and the combination of eagerly rolled up attributes desired. For example, service node 104 may be further configured (e.g., as indicated by the addressing scheme in one embodiment) to eagerly roll up along the hierarchy of the color dimension of FIG. 2, thereby generating additional insert or modify commands for database 106 utilizing keys such as (primary, cube, January $1^{st}$: 1 day), (all, cube, January $1^{st}$: 1 day), (primary, cube, January $1^{st}$: 2 days), etc. upon receipt of time series data indicating that a red cube was sold on January $1^{st}$. As further detailed below, it should be recognized that such eager roll ups as performed by service node 104 may enable time domain queries issued by consumer clients 102 to be satisfied by fewer generated key-value queries to database 106. For example, if a time domain query for an 8-day range is received by service node 104, service node 104 may be able to satisfy the time domain query by transforming it into a single key-value query having a key associated with the 8-day range (e.g., (red, cube, January $1^{st}$: 8 days), if the time series data was eagerly rolled up to the 8 day granularity layer. However, if the time series data was not eagerly rolled up, the 8 separate key-value queries with 8 keys associated with the 1 day time window in the 8-day time range need to be generated by service node 104, thereby resulting in the requesting and summing up of the response from eight separate key-value queries (e.g., (red, cube, January $1^{st}$: 1 day), (red, cube, January $2^{nd}$: 1 day) . . . (red, cube, January $8^{th}$: 1 day). In one embodiment, service node 104 may use an algorithm to balance the time taken to eagerly roll up data versus time domain query processing time to determine how many granularity layers in which to roll up the time series data (or other key attributes). That is, more eager roll-up of data may mean less time processing queries.

Figure 5:
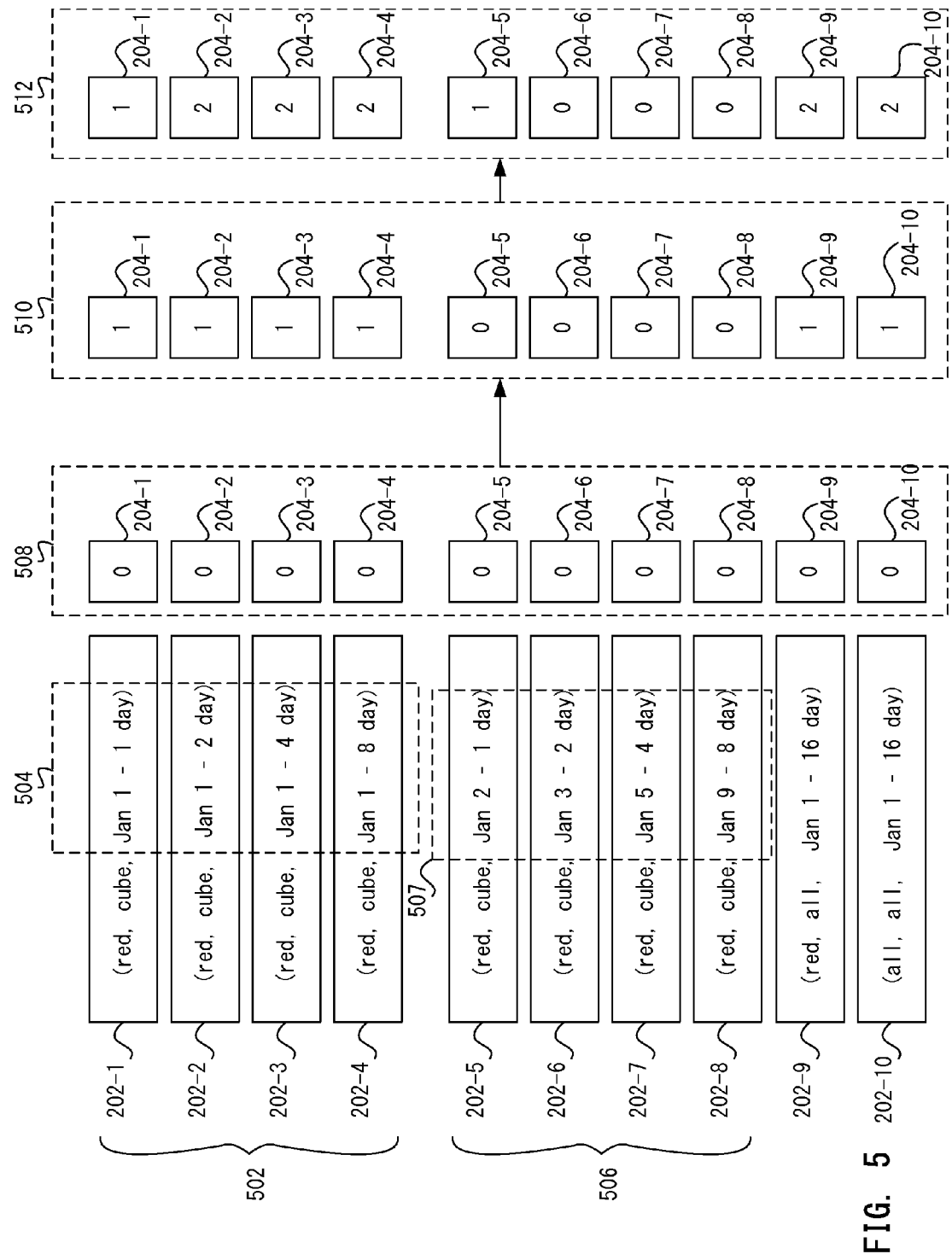
FIG. 5 shows an example of eagerly rolling up time series data according to one embodiment.

FIG. 5 shows an example of eagerly rolling up time series data according to one embodiment. For each time granularity layer, key-value database 106 includes a number of keys. A single key is associated with a time window. Thus, for an eight day period starting on January 1st, eight 1-day keys, four 2-day keys, two 4-day keys, and one 8-day key may exist. An example is shown for the first two keys of four different granularity layers. At 502, key-value database 106 includes key-value pairs for keys 202-1-202-4 that are each associated with a different granularity layer for the time dimension. For example, the time dimension is shown at 504 where the time windows start at January $1^{st}$ and cover 1, 2, 4, and 8 day periods.

At 506, key-value database 106 includes keys 202-5-202-8 that are the next keys in the four granularity layers. In the time dimension shown at 507, the start date is different for each time window due to the different time windows used in the first key 202 of each granularity layer. For example, for key 202-5, the granularity is 1 day and thus the time dimension for the next key in this granularity layer starts at January $2^{nd}$ and ends 1 day later. This is because key 202-1 covered the day of January $1^{st}$ and key 202-5 covers the next day starting at January $2^{nd}$. For key 202-6, the time dimension starts on January $3^{rd}$ and ends 2 days later. In this case, key 202-2 covers January $1^{st}$ through January $2^{nd}$ and key 202-6 covers January $3^{rd}$ through January $4^{th}$. An administrator uses the above process to determine these keys, and other keys for other time windows.

In alternative embodiments, rather than performing eager roll-ups, service node 104 or database 106 may be configured to perform "lazy roll-ups" of time series data. For example, rather than generating multiple keys (e.g., for different time granularities or higher level nodes of a dimensions hierarchy) and issuing multiple commands to database 106 upon receipt of time series data from producer client 104, service node 104 or database 106 may generate such multiple keys and issue corresponding commands subsequent to receipt of the time series data by service node 104, for example, through a batch mode process. As further discussed below, alternatively or in addition, roll-ups may also be performed by service node 104 or database 106 lazily upon receipt of certain queries. Additionally, an administrator may define keys for aggregation along dimensions other than the time dimension. For example, key-value database 106 includes a key 202-9 which aggregates along the shape dimension as the member for that dimension is 'All', a parent to other dimension members. In this case, all red toys sold regardless of shape for the 16-day period starting January $1^{st}$ are aggregated for key 202-9. Key 202-10 aggregates along the color and shape dimensions to count all toys regardless of color or shape for the 16-day period starting on January $1^{st}$.

Key-value database 106 modifies a value 204 when key-value database 106 receives a command for a key 202. For example, key-value database 106 receives an increment command for a key 202. At 508, key-value database 106 is shown including values 204-1-204-10 with a zero value. Although these keys 202 are shown, these keys 202 may not be stored in database 106 until service node 104 generates key 202 and inserts key 202 into database 202. For example, until a red cube is sold in the month of January, database 106 may not be storing keys 202 shown. However, keys 202 are shown for discussion purposes.

On January $1^{st}$, a red cube may be sold. When time series data is recorded for this transaction, service node 104 generates commands for keys 202 to eagerly roll up the time series data to some or all granularity layers. In other embodiments, the time series data may not be eagerly rolled up, but in this example, time series data is rolled up to all granularity layers. Service node 104 generates commands for keys 202-1, 202-2, 202-3, and 202-4, which have the applicable time window for a red cube sold on January $1^{st}$. At 510, key-value database 106 increments values 204-1, 204-2, 204-3, and 204-4 for each of these keys to "1". However, values 204-5, 204-6, 204-7, and 204-8 for keys 202-5, 202-6, 202-7, and 202-8 remain at 0 because the time windows for these keys start on January $2^{nd}$ or later and thus a red cube sold on January $1^{st}$ is not applicable for these time windows. Also, key-value database 106 increments values 204-9 and 204-10 for the aggregation along the color and shape dimensions.

On January $2^{nd}$, another red cube may be sold. Service node 104 generates commands for keys 202-2, 202-3, 202-4, and 202-5, which have the applicable time window for a red cube sold on January $2^{nd}$. At 512, key-value database 106 increments values 204-2, 204-3, 204-4, and 204-5 for keys 202-2, 202-3, 202-4, and 202-5. The time windows for keys 202-2, 202-3, and 202-4 include January $2^{nd}$ and the values for these keys 202 are incremented. Key-value database 106 increments value 204-5 for key 202-5 because the red cube has been sold on January $2^{nd}$ and applies to this 1-day time window. Key-value database 106 does not increment value 204-1 for key 202-1 because the time window for key 202-1 ended on January $1^{st}$. Also, key-value database 106 does not increment values 204 for keys 202-6, 202-7, and 202-8 because the time windows start after January $2^{nd}$. Values 204-9 and 204-10 for the aggregation along the color and shape dimensions are again incremented. This process continues as additional time series data is received.

Query Processing

In addition to collecting time series data from producer clients 102 and mapping the time series data into key-value data in database 106, service nodes 104 also receive and process time domain queries issued by consumer clients 102. Each service node 104 may process queries independently of one another. A time domain query typically includes a time range such as "how many red cubes were sold in January?" Because data is stored in database 106 in accordance with keys having attributes consistent with a specified addressing scheme, a single key to satisfy an arbitrary time range (e.g., 31 days beginning from January $1^{st}$) may not exist. As such, service node 104 may break up a time series query into multiple key-value queries corresponding to keys consistent with the time granularity layers of the specified addressing scheme.

In one example, service node 104 translates a time domain query for the number of red cubes sold in January into 31 separate key-value queries (for 31 days in January) corresponding to keys associated with each day in January (i.e., using the finest granularity layer in FIG. 1 of 1 day). Upon receiving all 31 values from database 106, service node 104 can sum up the values to calculate an answer to the time domain query. However, if eager roll ups, as previously discussed, were performed by service node 104, then different time windows in different granularity layers may be used by service node 104 to satisfy the time domain query. For example, in an eager roll-up configuration, rather than generating 31 key-value queries, service node 104 may generate 6 key-value queries for three 8-day time windows, a 4-day time window, a 2-day time window, and a 1-day time window.

Figure 6:
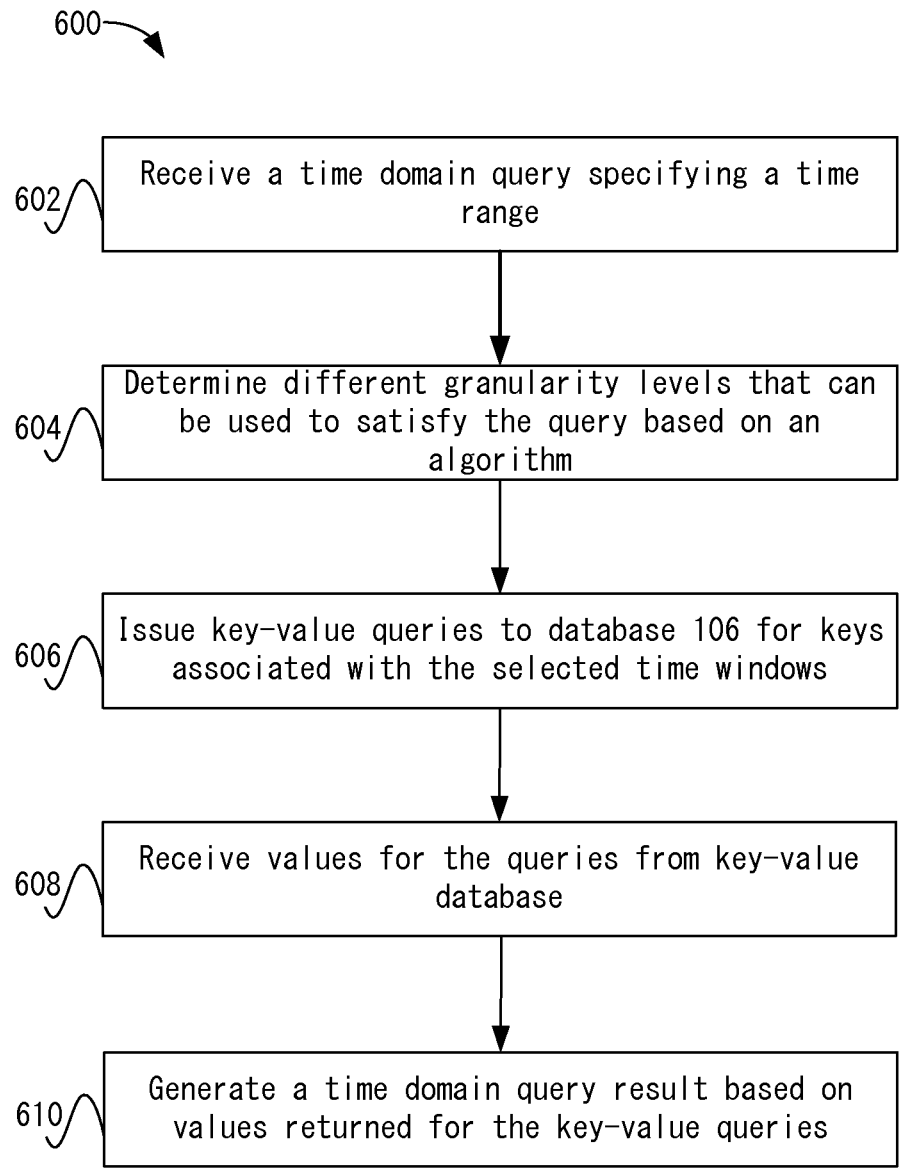
FIG. 6 depicts a simplified flowchart of a method for processing a time range query according to one embodiment.

FIG. 6 depicts a simplified flowchart 600 of a method for processing a time domain query according to one embodiment. In one embodiment, service node 104 utilizes an algorithm to traverse the different granularity layers of the addressing scheme to determine which time windows to use. For example, a "best fit" algorithm may be used to determine an optimal fit of time windows. The best fit algorithm may balance which granularity layers to use based on criteria, such as accuracy or query processing speed. At 602, service node 104 receives a time domain query specifying a time range such as "January 1-7-days". In addition to the time range, other dimension values may be specified, such as "red" and "cube."

Figure 7:
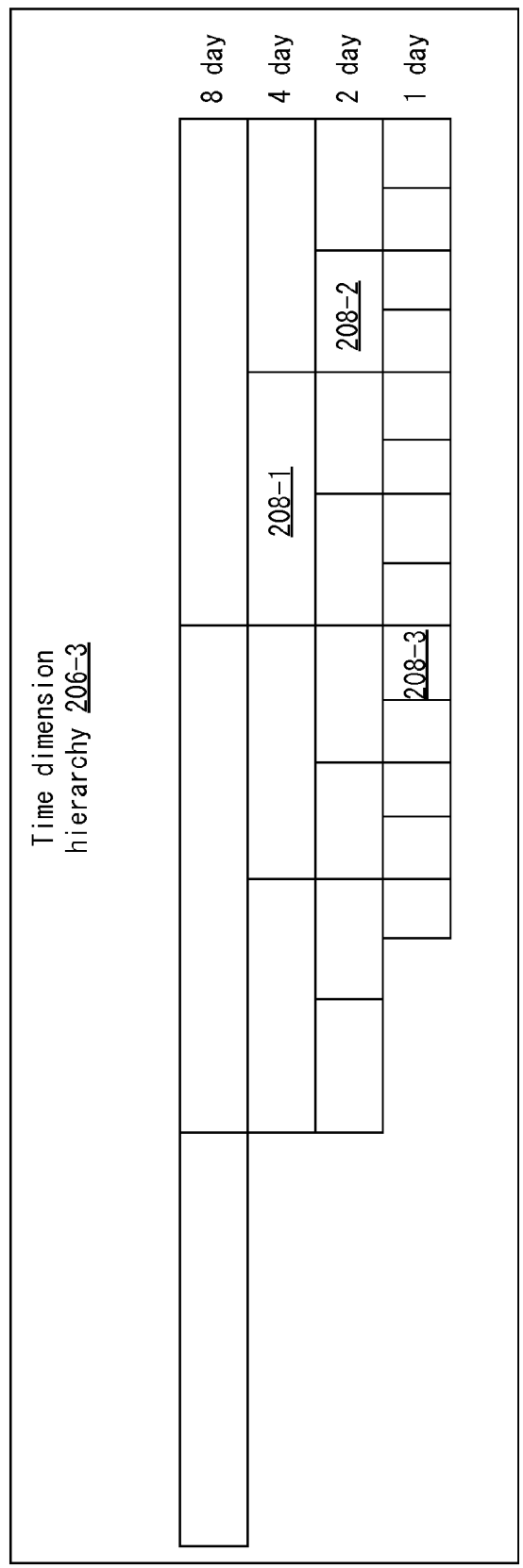
FIG. 7 shows an example of selecting time windows in a time dimension hierarchy according to one embodiment.

At 604, service node 104 determines different granularity layers that can be used to satisfy the query based on an algorithm. For example, FIG. 7 shows an example of selecting time windows in a time dimension hierarchy 206-3 according to one embodiment. To satisfy a time range query for 7 days, service node 104 selects a first time window 306 for a 4-day period; a second time window 308 for a 2-day period; and a third time window 310 for a 1-day period. The values for these time windows are equal to the 7-day range and can be used to satisfy the time range query. In one embodiment, service node 104 selects non-overlapping time windows.

At 606, service node 104 issues key-value queries to database 106 for keys associated with the selected time windows. For example, three key-value queries for keys 202 associated with time windows 306, 308, and 310 are issued to key-value database 106.

At 608, service node 104 receives values 204 for the queries from key-value database 106. At 610, service node 104 generates a time domain query result based on values 204 returned for the key-value queries. For example, the received values 204 may be summed or accumulated for the time windows and then returned to consumer client 102.

The above example found time windows that precisely fit the time range; however, it should be recognized that sometimes the time windows may not precisely fit the time range. The best fit algorithm may be used to determine time windows that can most accurately determine the result while balancing the number of queries needed. In some cases, the best fit algorithm may not determine time windows that exactly cover the time range. For example, interpolation may be used to estimate portions of the time range not covered by a key 202. Also, the accuracy required may not need every portion of the time range to be accounted for by a key 202. Additionally, the number of queries may be reduced by leveraging time windows that may extend into the future. For example, if the time range query is for the last 7 days, a 4-day period that includes the last 3 days and a day in the future may be selected instead of a 2-day period and a 1-day period. This is because the value for the 1 day in the future is 0 and thus, the 4-day period really includes the data for the last 3 days. This may reduce the number of queries required by using higher granularity layers to satisfy a query.

Furthermore, as previously mentioned, service node 104 may perform lazy roll-ups upon receipt of certain queries instead of or in addition to eager roll-ups or batch-based lazy roll-ups as previously discussed. For example, service node 104 may receive a time domain query from a consumer client 102 relating to the question, "how many red objects were sold on January $1^{st}$?" By consulting the addressing scheme, service node 104 may initially generate a key-value query such as "GET (red, all, January $1^{st}$: 1 day)" which corresponds to the time domain query. However, if eager roll ups or batch-based lazy roll ups have not been previously performed for such data, database 106 may indicate that no value is associated with such a key. If no value is associated with the key, service node 104 may further consult the addressing scheme in order to generate additional key-value queries relating to lower layer attributes for the shape dimension hierarchy. For example, service node 104 may generate two separate key-value queries for database 106 based on the lowest layer of the shape dimension hierarchy (e.g., cube and ball): (i) GET (red, cube, January $1^{st}$: 1 day) and (ii) GET (red, ball, January $1^{st}$: 1 day). Upon receiving values for these two queries, service node 104 can add them up and return the result to consumer client 102. Furthermore, service node 104 can further insert the result into database 106 (or cache the value) corresponding to the key (red, all, January $1^{st}$: 1 day) such that a response for a subsequent query for the key will be immediately available, rather than requiring a traversal by service node 104 through the hierarchies of the addressing schema.

Service Node and Key-Value Database Examples

Figure 8:
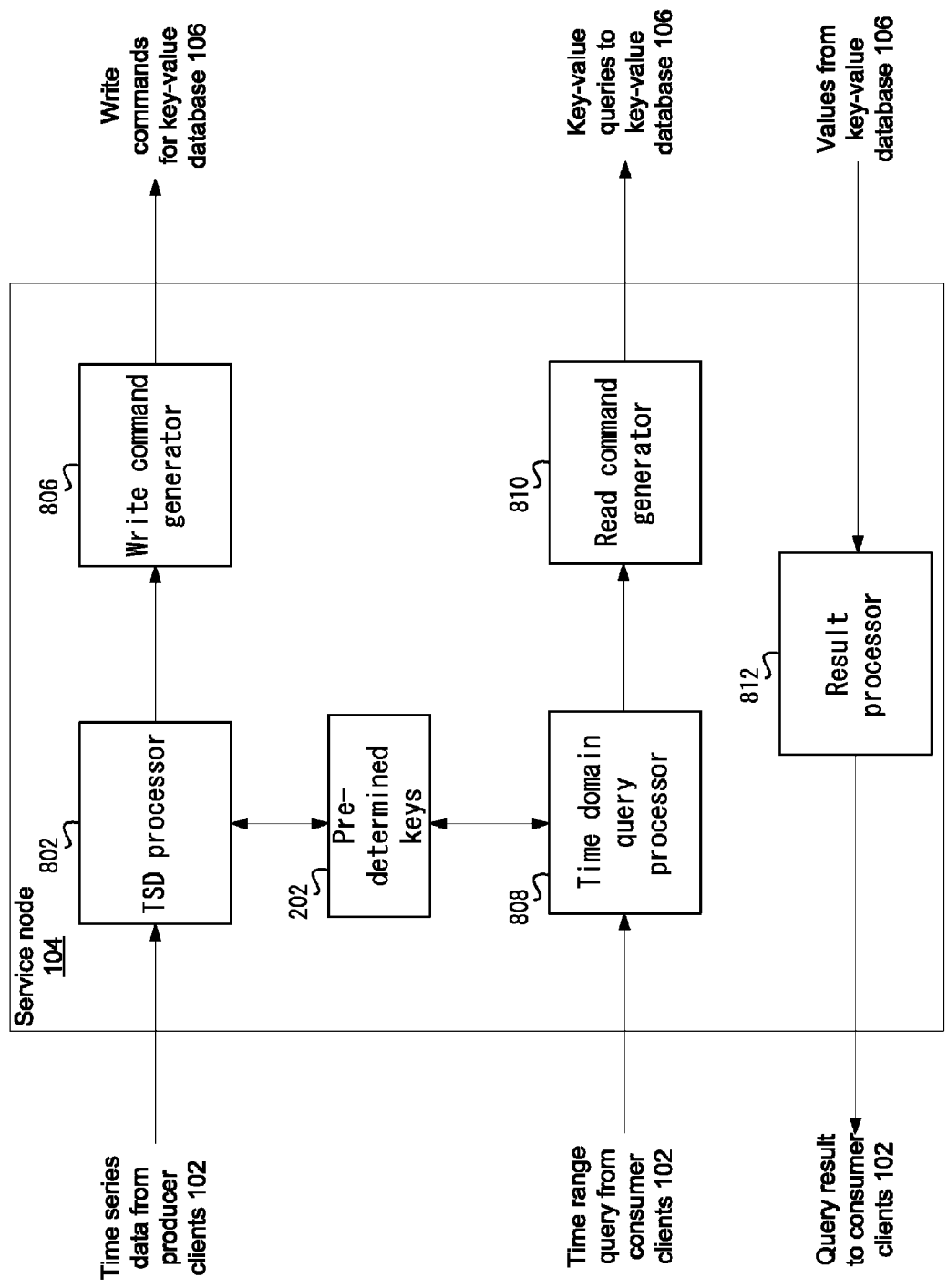
FIG. 8 depicts a more detailed example of a service node according to one embodiment.

FIG. 8 depicts a more detailed example of a service node 104 according to one embodiment. During data collection, a time series data (TSD) processor 802 receives time series data from producer clients 102 and generates keys 202 for the time series data by consulting a specified addressing scheme developed by an administrator. Such an addressing scheme, as previously discussed, may specify to service node 104 which pre-determined keys 202 to select based on a number of attributes (e.g., color, shape, and time). A write command generator 806 generates key-value commands (e.g., insert, modify, etc.) based on the generated keys to transmit to key-value database 106.

During subsequent query processing, a time domain query processor 808 receives time domain queries from consumer clients 102 and generates one or more key-value queries to issue to database 106 in order to satisfy the time domain queries. For example, time domain query processor 808 applies a best fit algorithm that determines time windows that are considered the best fit for the time range. A read command generator 810 generates key-value queries for key-value database 106 and sends the key-value queries to key-value database 106. Result processor 812 receives values 204 for the queries from key-value database 106, and determines a result for the time range query. For example, the returned values 204 may be summed or accumulated. Result processor 812 then returns the result to a consumer client 102.

Figure 9:
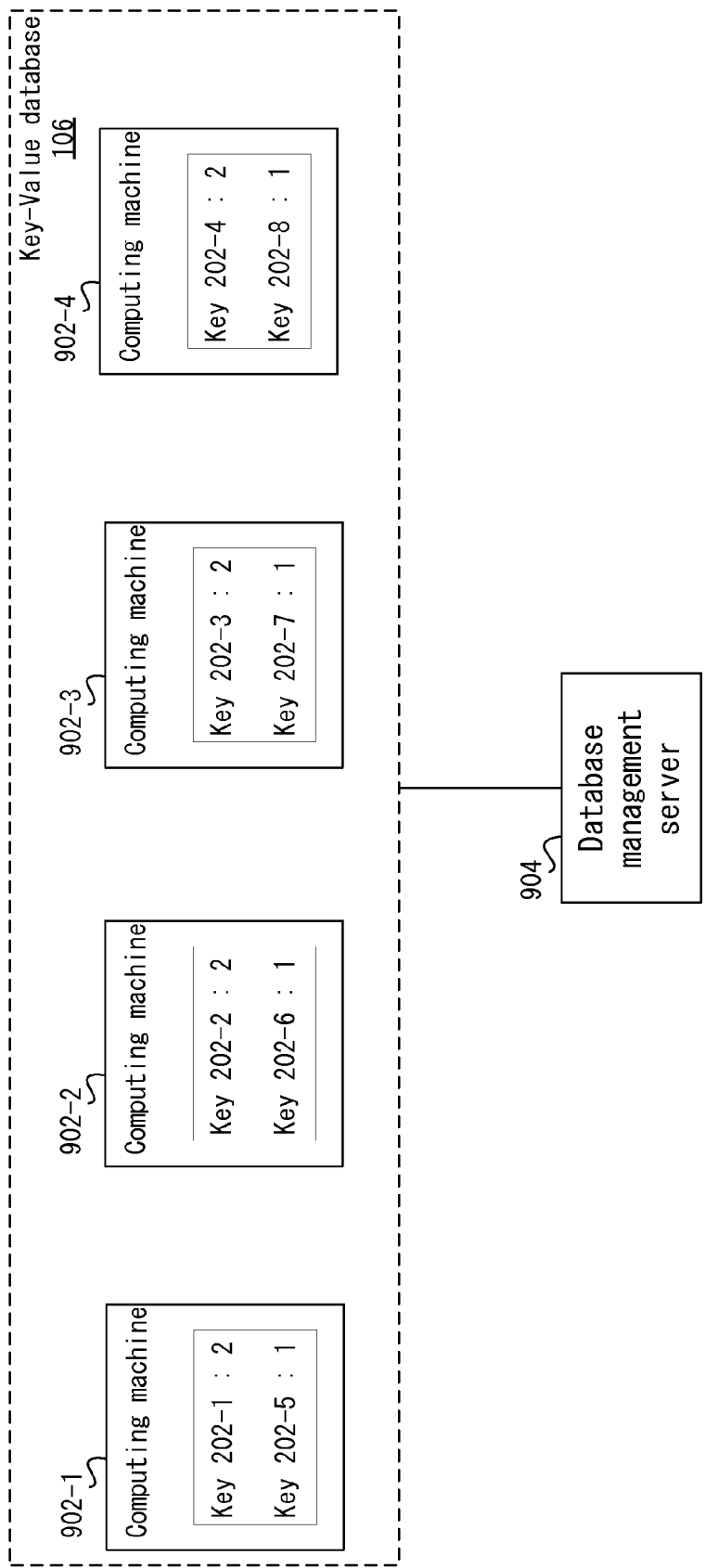
FIG. 9 depicts a more detailed example of a key-value database according to one embodiment.

FIG. 9 depicts a more detailed example of key-value database 106 according to one embodiment. Different computing machines 902 may be used to store key-value pairs. For example, key-value database 106 may be sharded across multiple machines, where sharding distributes the key-values among the machines in a cluster of machines. Service nodes 104 may insert keys 202 such that keys for a specific granularity layer exist on one machine 902 and not another.

Using keys 202 described in FIG. 5, a machine 902-1 includes key 202-1 and key 202-5 and corresponding values for those keys for the 1 day granularity layer. Similarly, machine 902-2 includes key 202-2 and key 202-6 for the 2-day granularity layer; machine 902-3 includes keys 202-3 and 202-7 for the 4-day granularity layer; and machine 902-4 includes keys 202-4 and 202-8 for the 8-day granularity layer.

A database management server 904 manages queries for keys 202 and modifying of values 204. Service node 104 may route key-value queries to different machines 902 depending on where keys 202 are located. This may be different from doing a row scan of a single table when using a relational database. For example, particular embodiments may query for key 202-3 in machine 902-3 and key 202-6 in machine 902-2.

Conclusion

Accordingly, by having service node 104 map from the time domain to the key-value domain, flexibility to store the data in different storage technologies may be provided. For example, because key value databases are a lowest common denominator for storing data, different storage technologies can support the key-value format. Also, because service node 104 retrieves the data using key-value semantics, the queries remain simple and row scans do not need to be performed. Granularity layers also provide faster response time to queries.

In one example, an administrator may want to measure web site performance. When a user visits a web site, producer client 102 captured the time the web site was visited. Service node 104 generates a command for the visit (response time could also be measured, but is not described). In one example, the command is an increment command for a key that is an N-tuple. The key includes the attributes of "Application name", "Server name", and "Time". The time dimension indicates a time window in which the web site was visited in a finest granularity layer. Service node 104 may resolve the command to other commands for higher granularity layers. Key-value database 106 receives these commands and increments the applicable values for the keys.

A user may then query for various time ranges. For example, service node 104 receives a query asking for all visits in a time range for "Application #1" associated with Server #1". Service node 104 determines keys for different granularities for the time range and queries for those keys are performed. Service node 104 sums or accumulates results from the key-value queries to determine the number of web site visits in the time range for Application #1 using Server #1.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like. One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, while the foregoing description discussed service nodes 104 providing functionality to transform time series data into key-value commands for database 106 as well as to transform time domain queries into key-value queries for database 106, it should be recognized that alternative embodiments may incorporate such functionality into the producer and consumer clients 102 themselves or within database 106 itself. Based on the above disclosure and the following claims, other arrangements, embodiments, implementations and equivalents may be employed without departing from the scope of the invention as defined by the claims.

What is claimed is:

1. A method comprising:
 receiving time series data for a series of events, the time series data including data for an occurrence of an event, the data including one or more attributes of the event and a time at which the event occurred;
 generating a first key for the event and a second key for the event, each of the first key and second key being a composite key of a key-value database, wherein:
  the first key includes a representation of the one or more attributes of the event and a representation of a first time window in which the event occurred, the first time window having a window start time and a first duration; and
  the second key includes the representation of the one or more attributes of the event and a representation of a second time window in which the event occurred, the second time window having the same window start time and a second duration that is longer than the first duration;
 issuing a first command to store a representation of the occurrence of the event as a value in the key-value database in a first record that is associated with the first key, the first record being retrievable by a first query having a condition specifying a first time range that matches the first duration in length; and
 issuing a second command to store the occurrence of the event as a value in the key-value database in a second record that is associated with the second key, the second record being retrievable by a second query having a condition specifying a second time range that matches the second duration in length.

2. The method of claim 1, wherein the key-value database stores a representation of the occurrence of the event as an updated first count in the first record and as an updated second count in the second record.

3. The method of claim 1, further comprising one of:
 executing the first command and second command upon receiving the time-series data; or
 executing the first command and second command upon receiving the first or second query.

4. The method of claim 1, wherein generating the first key and the second key comprises generating the first key and the second key at a same time upon receiving the time series data.

5. The method of claim 1, further comprising:
 receiving a query specifying a time range that is longer than a sum of the first duration of the first time window and the second duration of the second time window;
 determining a set of keys that includes at least one key that includes a representation of a time window that has a duration that is equal to the first duration and another key that includes a representation of a time window that has a duration that is equal to the second duration; and
 issuing a set of key-value queries to the key-value database using the set of keys.

6. The method of claim 5, further comprising:
 receiving a result for each key-value query in the set of key-value queries from the key-value database, where each result corresponding to count of occurrences of the even in a portion of time range as specified in the respective key-value query; and
 determining a result set for the query specifying the time, including combining the results of the key-value queries.

7. The method of claim 1, further comprising:
 receiving a query specifying a time range that is defined by a time of receiving the query and a time before receiving the query;
 determining a plurality of time segments, each of the time segments having a duration that corresponds to the first duration or the second duration, wherein a sum of the time segments, less portions of the time segments that extend to a future that includes time after receiving the query, is equal to the time range;
 determining each key in a set of keys based on a different time segment in the plurality of time segments; and
 issuing a set of key-value queries to the key-value database using the set of keys.

8. The method of claim 7, further comprising:
receiving result of each of the key-value queries, wherein each of the key-value queries corresponds to a different key in the set of keys; and
designating an aggregation of the received result as a result set of the query specifying the time range.

9. A non-transitory computer-readable storage medium containing instructions to cause a computer system to perform operations comprising:
receiving time series data for a series of events, the time series data including data for an occurrence of an event, the data including one or more attributes of the event and a time at which the event occurred;
generating a first key for the event and a second key for the event, each of the first key and second key being a composite key of a key-value database, wherein:
the first key includes a representation of the one or more attributes of the event and a representation of a first time window in which the event occurred, the first time window being represented by a window start time and a first duration; and
the second key includes the representation of the one or more attributes of the event and a representation of a second time window in which the event occurred, the second time window having the same window start time and a second duration that is longer than the first duration;
issuing a first command to store an occurrence of the event in the key-value database in a first record that is associated with the first key, the first record being retrievable by a first query having a condition specifying a first time range that matches the first duration in length; and
issuing a second command to store the occurrence of the event as a value in the key-value database in a second record that is associated with the second key, the second record being retrievable by a second query having a condition specifying a second time range that matches the second duration in length.

10. The non-transitory computer-readable storage medium of claim 9, wherein the key-value database stores each occurrence of the event as an updated first count in the first record as an updated second count in the second record.

11. The non-transitory computer-readable storage medium of claim 9, the operations comprising one of:
executing the first command and second command upon receiving the time-series data; or
executing the first command and second command upon receiving the first or second query.

12. The non-transitory computer-readable storage medium of claim 9, wherein generate the first key and the second key comprises generate the first key and the second key at a same time upon receiving the time series data.

13. The non-transitory computer-readable storage medium of claim 9, the operations comprising:
receive a query specifying a range of time;
determine a set of keys that include time granularity attributes for at least a portion of the
range of time; and issue a set of key-value queries to the key-value database for the set of keys.

14. The non-transitory computer-readable storage medium of claim 13, the operations comprising:
receiving a result for each key-value query in the set of key-value queries from the key-value database, where each result corresponding to count of occurrences of the even in a portion of time range as specified in the respective key-value query; and determining a query result set for the query specifying the time, including combining the results of the key-value queries.

15. The non-transitory computer-readable storage medium of claim 13, wherein determining the set of keys comprises:
receiving a query specify a time range that is defined by a time of receiving the query and a time before receiving the query;
determining a plurality of time segment, each of the time segments having a duration that corresponds to the first duration or the second duration, wherein a sum of the time segments, less portions of the time segments that extend to a future that includes time after receiving the query, is equal to the time range; and
determining each key in the set based on a different time segments in the plurality of time segments.

16. An apparatus comprising:
one or more computer processors; and
a computer-readable storage medium comprising instructions for controlling the one or more computer processors to be operable to:
receiving time series data for a series of events, the time series data including data for an occurrence of an event, the data including one or more attributes of the event and a time at which the event occurred;
generating a first key for the event and a second key for the event, each of the first key and second key being a composite key of a key-value database, wherein:
the first key includes a representation of the one or more attributes of the event and a representation of a first time window in which the event occurred, the first time window having a window start time and a first duration; and
the second key includes the representation of the one or more attributes of the event and a representation of a second time window in which the event occurred, the second time window having the same window start time and a second duration that is longer than the first duration;
issuing a first command to store an occurrence of the event in the key-value database in a first record that is associated with the first key, the first record being retrievable a first query having a condition specifying a first time range that matches the first duration in length; and
issuing a second command to store the occurrence of the event as a value in the key-value database in a second record that is associated with the second key, the second record being retrievable by a second query having a condition specifying a second time range that matches the second duration in length.

17. The apparatus of claim 16, wherein the key-value database stores each occurrence of the event as an updated first count in the first record and as an updated second count in the second record.

18. The apparatus of claim 16, the operations comprising:
receive a query specifying time range that is longer than a sum of the first duration of the first time window and the second duration of the second time window;
determine a set of keys that includes at least one key that includes a representation of a time window that has a duration that is equal to the first duration and another key that includes a representation of a time window that has a duration that is equal to the second duration; and
issuing a set of key-value queries to the key-value database using the set of keys.

19. The apparatus of claim 18, the operations comprising:
receiving a result of each of the key-value queries, wherein each of the key-value queries corresponds to a different key in the set of keys; and
designating an aggregation of the received results as a result set of the query specifying the time range.

20. The apparatus of claim 18, the operations comprising one of;
executing the first command and second command upon receiving the time-series data; or
executing the first command and second command upon receiving the first or second query.

21. The apparatus of claim 18, wherein the key-value database stores a representation of the occurrence of the event as an updated first count in the first record and as an updated second count in the second record.

\* \* \* \* \*

UNITED STATES PATENT AND TRADEMARK OFFICE
CERTIFICATE OF CORRECTION

| | | |
|---|---|---|
| PATENT NO. | : 8,745,014 B2 | Page 1 of 1 |
| APPLICATION NO. | : 13/277054 | |
| DATED | : June 3, 2014 | |
| INVENTOR(S) | : Jonathan Travis | |

It is certified that error appears in the above-identified patent and that said Letters Patent is hereby corrected as shown below:

In the Claims:

Column 14, line 26, in Claim 3, delete "of;" and insert -- of: --, therefor.

Column 14, line 49, in Claim 6, delete "even" and insert -- event --, therefor.

Column 15, line 2, in Claim 8, delete "receiving" and insert -- receiving a --, therefor.

Column 15, line 66, in Claim 14, delete "even" and insert -- event --, therefor.

Column 16, line 6, in Claim 15, delete "specify" and insert -- specifying --, therefor.

Column 16, line 9, in Claim 15, delete "segment," and insert -- segments, --, therefor.

Column 16, line 44, in Claim 16, delete "a" and insert -- by a --, therefor. (First Occurrence)

Signed and Sealed this
Eighteenth Day of November, 2014

Michelle K. Lee
*Deputy Director of the United States Patent and Trademark Office*